(12) United States Patent
Salter et al.

(10) Patent No.: US 10,220,784 B2
(45) Date of Patent: Mar. 5, 2019

(54) LUMINESCENT WINDSHIELD DISPLAY

(71) Applicant: Ford Global Technologies, LLC, Dearborn, MI (US)

(72) Inventors: Stuart C. Salter, White Lake, MI (US); Paul Kenneth Dellock, Northville, MI (US); James J. Surman, Clinton Township, MI (US); Aaron Bradley Johnson, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/362,890

(22) Filed: Nov. 29, 2016

(65) Prior Publication Data

US 2018/0147990 A1    May 31, 2018

(51) Int. Cl.
*B60Q 3/12* (2017.01)
*B60R 1/00* (2006.01)
*B60Q 9/00* (2006.01)

(52) U.S. Cl.
CPC .............. *B60R 1/001* (2013.01); *B60Q 3/12* (2017.02); *B60Q 9/008* (2013.01)

(58) Field of Classification Search
CPC .... G02B 27/01; G02B 2027/014; G02B 5/20; G01S 13/723; G01S 13/87; G01S 13/931; G08G 1/166; G08G 1/165; G08G 1/167; B60K 2350/2052; G06K 9/00798; G06K 9/00805; B60R 2300/205; B60R 1/00; B60R 1/001; G01C 21/365; B32B 17/10036
See application file for complete search history.

(56) References Cited

U.S. PATENT DOCUMENTS

| | | | |
|---|---|---|---|
| 2,486,859 A | 11/1949 | Meijer et al. | |
| 5,053,930 A | 10/1991 | Benavides | |
| 5,709,453 A | 1/1998 | Krent et al. | |
| 5,839,718 A | 11/1998 | Hase et al. | |
| 6,031,511 A | 2/2000 | DeLuca et al. | |
| 6,117,362 A | 9/2000 | Yen et al. | |
| 6,294,990 B1 | 9/2001 | Knoll et al. | |
| 6,348,877 B1* | 2/2002 | Berstis ................ | G01C 23/005 340/961 |
| 6,419,854 B1 | 7/2002 | Yocom et al. | |
| 6,494,490 B1 | 12/2002 | Trantoul | |
| 6,577,073 B2 | 6/2003 | Shimizu et al. | |

(Continued)

FOREIGN PATENT DOCUMENTS

| CN | 101337492 A | 1/2009 |
|---|---|---|
| CN | 201169230 Y | 2/2009 |

(Continued)

*Primary Examiner* — Nabil H Syed
*Assistant Examiner* — Cal J Eustaquio
(74) *Attorney, Agent, or Firm* — Vichit Chea; Price Heneveld LLP

(57) ABSTRACT

A display system of a vehicle is provided herein. The display system includes light sources and an indicator that luminesces in response to light excitation by the light sources. A controller is provided for selectively operating each of the light sources based on input from one or more proximity sensors. The indicator luminesces in one of a number of colors depending on which of the light sources is activated and each color indicates the proximity of a detected object relative to the vehicle.

6 Claims, 4 Drawing Sheets

(56) References Cited

U.S. PATENT DOCUMENTS

| | | |
|---|---|---|
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,986,581 B2 | 1/2006 | Sun et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,347,576 B2 | 3/2008 | Wang et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 * | 8/2013 | Labrot ............. B32B 17/10 250/461.2 |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,008,917 B2 | 4/2015 | Gautama et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,067,530 B2 | 6/2015 | Bayersdorfer et al. |
| 9,187,034 B2 | 11/2015 | Tarahomi et al. |
| 9,299,887 B2 | 3/2016 | Lowenthal et al. |
| 9,452,709 B2 | 9/2016 | Aburto Crespo |
| 2002/0159741 A1 | 10/2002 | Graves et al. |
| 2002/0163792 A1 | 11/2002 | Formoso |
| 2003/0167668 A1 | 9/2003 | Kuks et al. |
| 2003/0179548 A1 | 9/2003 | Becker et al. |
| 2004/0202001 A1 * | 10/2004 | Roberts ................. B60Q 9/00 362/494 |
| 2004/0213088 A1 | 10/2004 | Fuwausa |
| 2005/0084229 A1 | 4/2005 | Babbitt et al. |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0171290 A1 * | 7/2007 | Kroger ................. G06T 3/4015 348/272 |
| 2007/0244641 A1 * | 10/2007 | Altan ................. B60Q 9/008 701/300 |
| 2007/0255491 A1 * | 11/2007 | Geelen ................. G01C 21/26 701/465 |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0051516 A1 * | 2/2009 | Abel ................. B60W 50/14 340/436 |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0052042 A1 * | 3/2011 | Ben Tzvi ............. G06T 19/006 382/154 |
| 2011/0265360 A1 | 11/2011 | Podd et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0038712 A1 | 2/2013 | Valaix |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0355106 A1 | 12/2014 | Laluet et al. |
| 2014/0373898 A1 | 12/2014 | Rogers et al. |
| 2015/0046027 A1 | 2/2015 | Sura et al. |
| 2015/0085488 A1 | 3/2015 | Grote, III et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2015/0274995 A1 | 10/2015 | Dain |
| 2015/0307033 A1 | 10/2015 | Preisler et al. |
| 2016/0016506 A1 | 1/2016 | Collins et al. |
| 2016/0102819 A1 | 4/2016 | Misawa et al. |
| 2016/0236613 A1 | 8/2016 | Trier |
| 2016/0240794 A1 | 8/2016 | Yamada et al. |
| 2017/0158125 A1 | 6/2017 | Schuett et al. |
| 2017/0253179 A1 | 9/2017 | Kumada |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| DE | 69928813 T2 | 8/2006 |
| DE | 102012011827 A1 | 12/2013 |
| EP | 1793261 A1 | 6/2007 |
| EP | 2778209 A1 | 9/2014 |
| FR | 2578797 A1 | 9/1986 |

(56) References Cited

FOREIGN PATENT DOCUMENTS

| | | | |
|---|---|---|---|
| FR | 2926520 | A1 | 7/2009 |
| JP | 2000159011 | A | 6/2000 |
| JP | 2007238063 | A | 9/2007 |
| KR | 20060026531 | A | 3/2006 |
| WO | 2006047306 | A1 | 5/2006 |
| WO | 2014068440 | A1 | 5/2014 |
| WO | 2014161927 | A1 | 10/2014 |

* cited by examiner

LUMINESCENT WINDSHIELD DISPLAY

FIELD OF THE INVENTION

The present invention generally relates to displays of a vehicle, and more particularly, to vehicle windshield displays.

BACKGROUND OF THE INVENTION

Photoluminescent materials offer a unique and attractive viewing experience. Accordingly, there is a need and desire to employ such materials in a vehicle windshield display system.

SUMMARY OF THE INVENTION

According to one aspect of the present invention, a display system of a vehicle is provided. The display system includes a light source disposed inside the vehicle and an indicator coupled to a windshield and configured to luminesce in response to light excitation by the light source. One or more proximity sensors are provided for detecting objects in a vehicle operating environment. A controller is provided for operating the light source based on input received from the sensors.

According to another aspect of the present invention, a display system of a vehicle is provided. The display system includes a first and second light source disposed inside the vehicle and an indicator coupled to a windshield and configured to luminesce in response to light excitation by the first and second light sources. A number of proximity sensors are provided for detecting objects in a vehicle operating environment. A controller is provided for selectively operating the first and second light sources based on input received from the proximity sensors.

According to yet another aspect of the present invention, a display system of a vehicle is provided. The display system includes light sources and an indicator that luminesces in response to light excitation by the light sources. A controller is provided for selectively operating each of the light sources based on input from one or more proximity sensors. The indicator luminesces in one of a number of colors depending on which of the light sources is activated and each color indicates the proximity of a detected object relative to the vehicle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
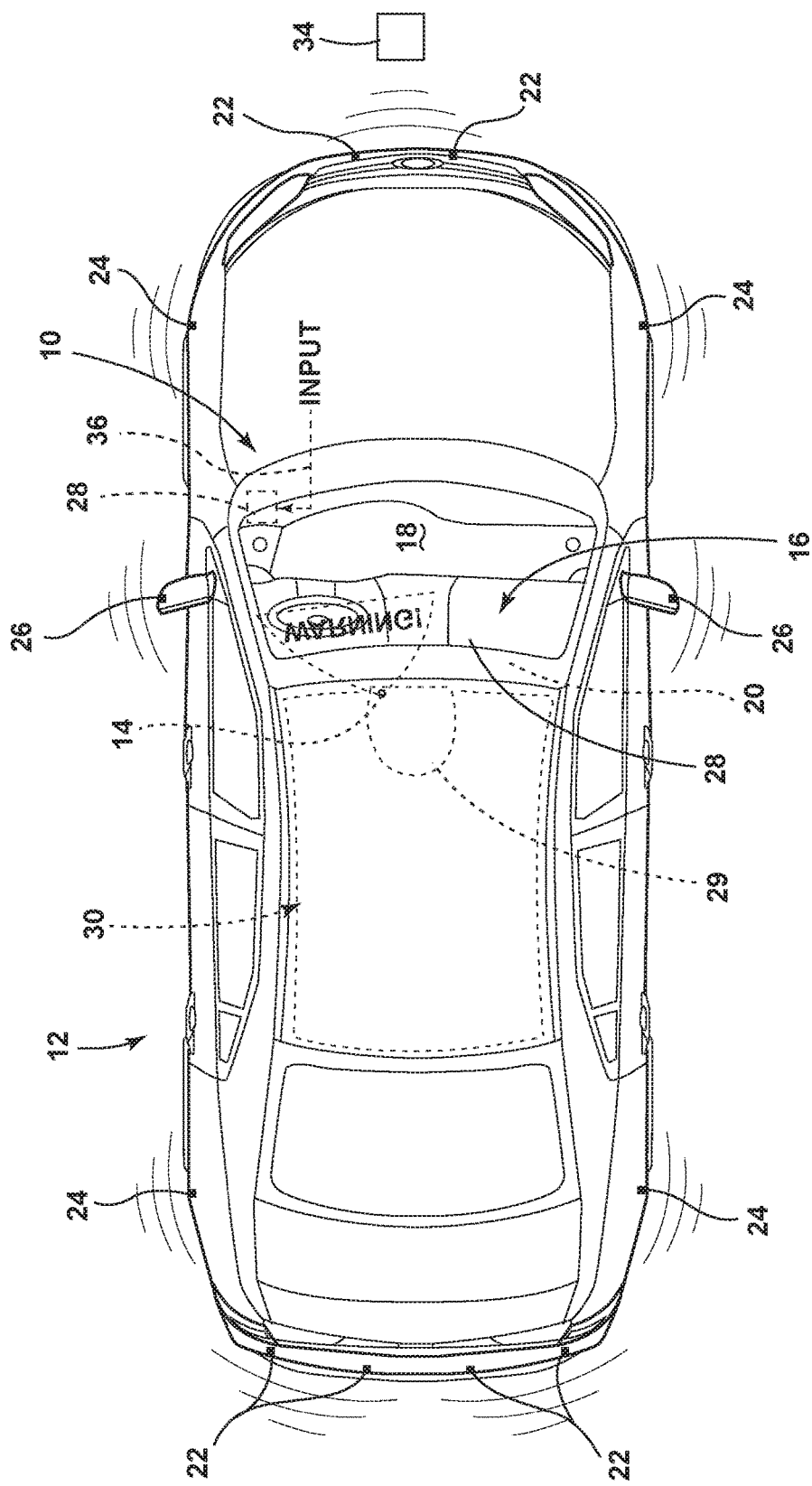
FIG. 1 is a schematic view of a display system of a vehicle according to one embodiment.

Referring to FIG. 1, a display system 10 of a vehicle 12 is shown according to one embodiment. The display system 10 includes a light source 14 disposed inside the vehicle 12 and an indicator 16 coupled to a windshield 18. The indicator 16 is configured to luminesce in response to light excitation 20 by the light source 14. The display system 10 also includes one or more proximity sensors, exemplarily shown as proximity sensors 22, 24, and 26, for detecting objects proximate the vehicle 12. A controller 28 is provided for operating the light source 14 based on input received from the proximity sensors 22, 24, 26.

In the depicted embodiment, the indicator 16 is located at an upper driver side portion 28 of the windshield 18, but may otherwise be shifted towards the center or passenger side of the vehicle, if desired. Alternatively, the indicator 16 may be located at a side portion, a bottom portion, or any other portion of the windshield 18 that is visible to a driver of the vehicle 12. The indicator 16 is composed from a photoluminescent material arranged to luminesce as a text, symbol, icon, indicia, shape, or other visual, in response to light excitation 20 by the light source 14. In one specific example, the photoluminescent material is printed to a substrate (e.g., a clear film) and adhered to the windshield 18. Alternatively, the photoluminescent material may be directly printed to the windshield 18. Alternatively still, the windshield 18 may be etched in the shape of the indicator 16 and the photoluminescent material may be deposited inside the etched area. With respect to the embodiments described herein, it is to be understood that the indicator 16 may be coupled to a side of the windshield 18 facing the interior or exterior of the vehicle 12, or otherwise integrated inside the windshield 18.

Figure 2:
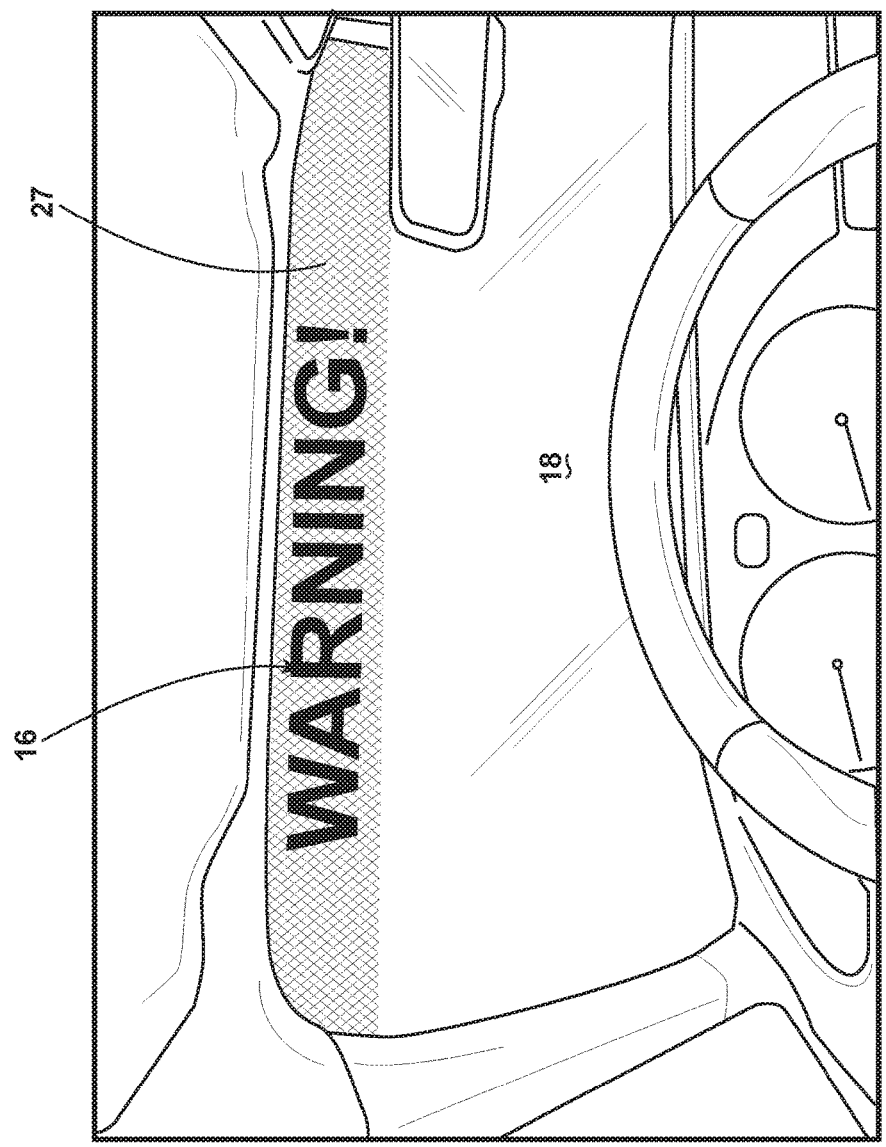
FIG. 2 illustrates an indicator from the point of view of a driver of the vehicle, wherein the indicator is capable of luminescing in response to excitation light.

According to one embodiment, the indicator 16 includes a photoluminescent material that is typically invisible to the human eye while in an unexcited state, or in other words, absent light excitation 20 by the light source 14. For example, the photoluminescent material may include an ultraviolet (UV) or infrared (IR) ink coupled to the windshield 18 in any manner prescribed previously herein. By virtue of the photoluminescent material being invisible, the indicator 16 may be variously located on the windshield 18. However, it is generally preferable to locate the indicator 16 proximate peripheral portions of the windshield 18 so as not to obstruct the driver's view of a forward vehicle scene while the indicator 16 is excited by the light source 14. In many vehicles, the peripheral portions may include tint (e.g., tint 27; FIG. 2) and/or the frit. Accordingly, by locating the indicator 16 at peripheral portions, inadvertent excitation of the indicator 16 due to sunlight may be avoided. However, since many windshields are specially treated to block UV radiation, it should be appreciated that the suitable locations at which to provide the indicator 16 increases in vehicles equipped with such windshields.

With continued reference to FIG. 1, the light source 14 is disposed inside the vehicle 12 and oriented to provide light excitation 20 to the indicator 16. In the depicted embodiment, the light source 14 is coupled to an overhead console 29. In so doing, the light source 14 may benefit from existing electrical connections typically located inside the overhead console 29 and already configured to interface with vehicle control systems. For example, it is contemplated that the light source 14 may share a printed circuit board with map lamps, user-input mechanisms for opening/closing of a moon roof, or any other electrical device generally provided in a conventional overhead console. Thus, by packaging the light source 14 with other electrical devices of the overhead console 29, a cost savings may be realized relative to packaging the light source 14 separately and locating the light source 14 in vehicle areas lacking existing electrical connections. Another advantageous area in which to locate the light source 14 is a headliner 30 of the vehicle 12. For example, it is contemplated that the light source 14 may be coupled to an edge portion 32 of the headliner 30 proximate the windshield 18 and share electrical connections with a dome lamp and/or other electrical devices commonly located on vehicle roof structures.

According to one embodiment, the light source 14 may include one or more conventional light-emitting diodes (LEDs). The LED(s) may be packaged with optics to assist in directing light excitation 20 toward the indicator 16. Said optics may include conventional optics such as light guides, lenses that disperse or focus light, etc. In embodiments where the light source 14 is assembled in the headliner 30, it is contemplated that a silicone over mold lens may be optically coupled to each LED for directing light excitation onto the indicator 16. In embodiments where the indicator 16 is composed of a UV ink, the light source 14 emits UV light for exciting the indicator 16. Likewise, in embodiments where the indicator 16 is composed of IR ink, the light source 14 emits IR light for exciting the indicator 16. In such configurations, the indicator 16 converts the UV or IR light excitation 20 to a visible light. However, it is to be understood that the conversion of the light excitation 20 may occur via down-conversion or up-conversion. In either embodiment, the UV or IR ink may be formulated such that the resultant luminescence is expressed in a visible color chosen from an RGB color scale such as red or green. In instances where the light excitation 20 is UV or IR light, vehicle occupants will be unable to see and be distracted by the light excitation 20, thereby resulting in the indicator 16 appearing to glow on its own.

In operation, the light source 14 is operated by the controller 28 based on input received from proximity sensors 22, 24, and 26. In the depicted embodiment, proximity sensors 22 are located variously on the front and rear of the vehicle 12 and may be configured as parking sensors for detecting objects located forward and rearward of the vehicle 12. Proximity sensors 24 are located variously on the sides of the vehicle 12 and may be configured as cross traffic sensors for detecting approaching vehicles while backing the vehicle 12. Proximity sensors 26 are located in the side mirrors of the vehicle 12 and may be configured as blind spot monitors. It will be understood that the proximity sensors 22, 24, 26 are provided herein as examples of common sensors found on vehicles today. Furthermore, it will be appreciated that the proximity sensors 22, 24, 26 are not limited to any specific type and may be configured as ultrasonic sensors, radar sensors, LIDAR sensors, a combination thereof, or any other proximity sensors known to a skilled artisan.

With further reference to FIG. 1, the controller 28 interfaces wirelessly with the proximity sensors 22, 24, 26 via any known wireless communication protocol such as Bluetooth, Bluetooth Low Energy (BLE), or Wi-Fi, for example. Accordingly, it will be understood that the controller 28 and proximity sensors 22, 24, 26 may each be packaged with or otherwise coupled to a wireless communication device (e.g., a transceiver) to enable wireless signals to be transmitted between the controller 28 and the proximity sensors 22, 24, 26. In alternative embodiments, the controller 28 may interface with the proximity sensors 22, 24, 26 via a wired connection (e.g., over a LIN or CAN bus). However, by leveraging a wireless communication protocol, a cost savings may be incurred over the use of wires, which may require extensive routing throughout the vehicle 12.

With respect to the embodiments described herein, the controller 28 may be a standalone controller variously located in the vehicle 12 (e.g., in the overhead console 29) or otherwise be or integrated with a vehicle module. In the depicted embodiment, the controller 28 is a body control module (BCM) of the vehicle 12. In addition to receiving wireless signals from the proximity sensors 22, 24, 26, the controller 28 may receive input 36 from one or more vehicle equipment. In operation, the controller 28 activates the light source 14 to excite the indicator 16 if an object is detected to be within a predetermined distance from the vehicle 12. The object may be located to the front, rear, or side of the vehicle 12 and detected using any one of proximity sensors 22, 24, and 26. For purposes of illustration, an object 34 is shown in front of the vehicle 12 and may be detected using the proximity sensors 22 located on the front of the vehicle 12 during a parking maneuver or while the vehicle 12 is moving along a roadway, for example. The relative distance of the object 34 may be determined by the proximity sensors 22 and wirelessly transmitted to the controller 28. Alternatively, the controller 28 may determine the relative distance of the object 34 based on information supplied by the proximity sensors 22.

In the depicted embodiment, the indicator 16 is arranged to luminesce as a text displaying the word "WARNING!" (from the vantage point of the driver; see FIG. 2) when excited by the light source 14. As described previously herein, the indicator 16 may be formulated to luminesce in a variety of colors. For example, the indicator 16 may luminesce in a red color since red is generally associated with danger. As such, when the indicator 16 luminesces, the driver of the vehicle 12 is notified of a potentially dangerous condition such as a potential collision with a detected object including another vehicle, a pedestrian, a fixed object, or other road hazard detected by the proximity sensors 22, 24, 26. With respect to the embodiments described herein, the distance (between the vehicle 12 and a detected object) required for the controller to activate the light source 14 in order to excite the indicator 16 may be determined by the vehicle OEM and may vary for each of the proximity sensors 22, 24, 26.

Additionally, it is contemplated that the required distance may be shortened at higher speeds due to a decreased response time on the part of the driver to implement a countermeasure such as applying the brakes or executing an evasive maneuver. Accordingly, the required distance may be dependent on a vehicle speed provided to the controller 28 as input 36 by a vehicle speed sensor, for example. Additionally, input 36 may include an ambient light level supplied by a vehicle light sensor, thereby prompting the controller 28 to adjust the intensity of the light excitation 20 (e.g., via pulse-width modulation) based on whether the vehicle 12 is operating during the day or at night. In this manner, the controller 28 may operate the light source 14 at higher intensity during the day and lower intensity at night to ensure that the indicator 16 luminesces brightly enough to be seen by the driver of the vehicle 12.

Figure 3:
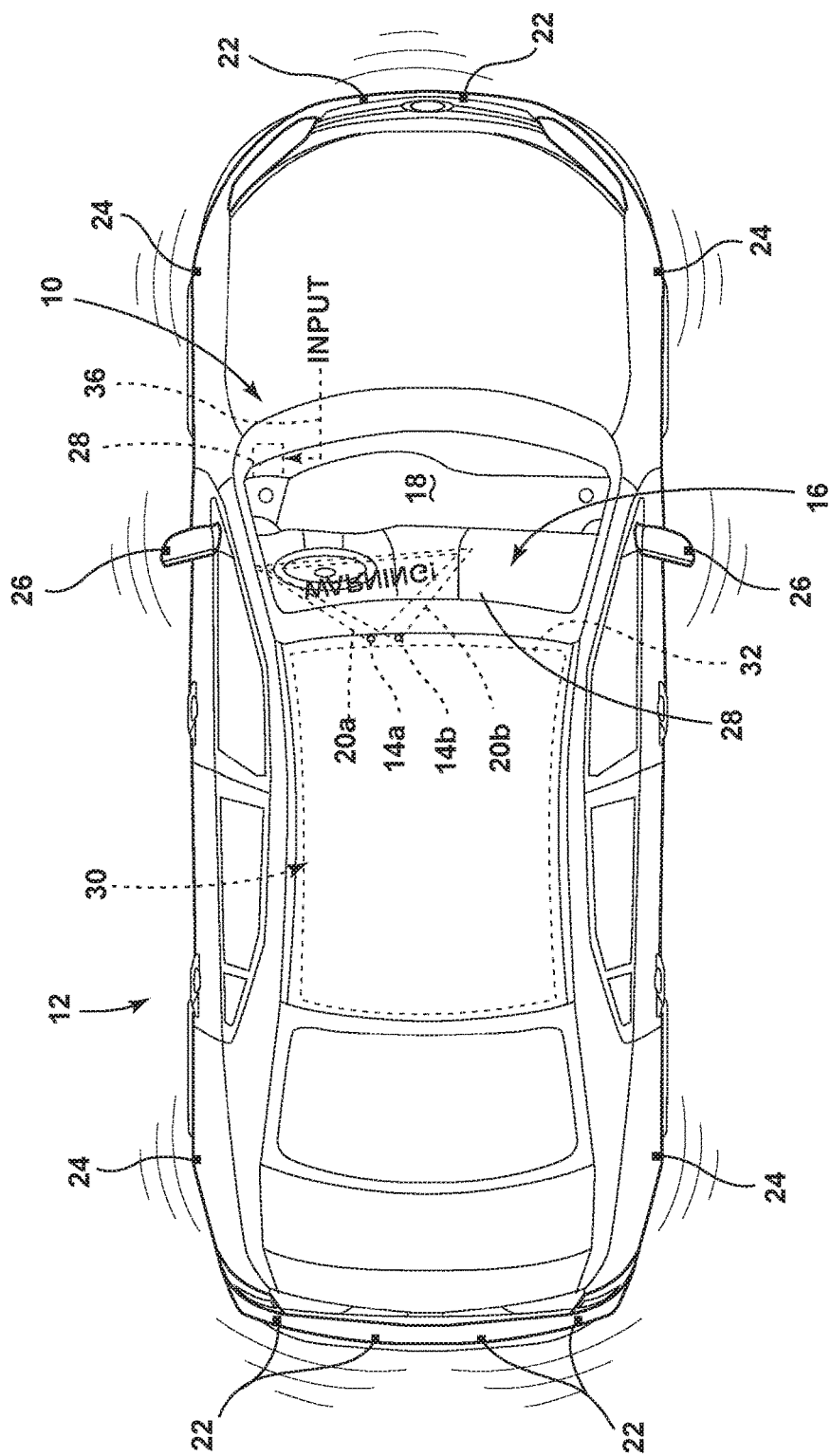
FIG. 3 is a schematic view of the display system according to another embodiment.

Referring to FIG. 3, an alternative embodiment of the display system 10 is shown. The display system 10 is configured similarly to that of FIG. 1 with the addition of one or more light sources. For purposes of illustration, two light sources, shown as light sources 14a and 14b, are located at edge portion 32 of the headliner 30 and are oriented to emit a corresponding light excitation 20a, 20b towards the indicator 16. In alternative embodiments, light sources 14a and 14b may be located at the overhead console 29 or elsewhere, if desired. The indicator 16 is formulated from a first photoluminescent material responsive to light excitation 20a from light source 14a, and a second photoluminescent material responsive to light excitation 20b from light source 14b. In the depicted embodiment, the first photoluminescent material is a UV ink configured to luminesce in a green color, and the second photoluminescent material is an IR ink configured to luminesce in a red color. Light source 14a includes one or more UV LEDs for exclusively exciting the UV ink, and light source 14b includes one or more IR LEDs for exclusively exciting the IR ink. In assembly, the first and second photoluminescent materials may be printed directly or indirectly onto the windshield 18 as a single layer or in separate layers. Alternatively, the first and second photoluminescent materials may be deposited in an etched area of the windshield 18 or otherwise coupled/integrated therewith.

Figure 4:
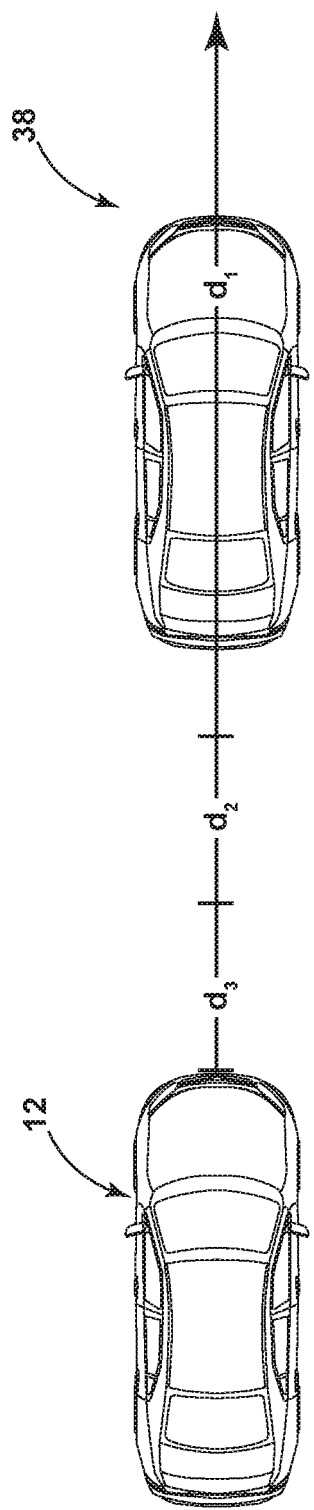
FIG. 4 illustrates a number of distance ranges in which an object may be detected, wherein detection of the object results in the indicator luminescing in one of a number of colors.

With continued reference to FIG. 3, the controller 28 selectively operates each of the light sources 14a, 14b based on input from one or more of the proximity sensors 22, 24, 26. In response, the indicator 16 luminesces in one of a number of colors depending on which of the light sources 14a, 14b is activated. As described previously herein, the input may be a distance determination between the vehicle 12 and a detected object, exemplarily shown as object 38 (FIG. 4). Alternatively, the input may correspond to information enabling the controller 28 to make the distance determination. In the depicted embodiment, the indicator 16 luminesces in up to three different colors depending on the activation state of light sources 14a and 14b. For example, if the object 38 is detected within a first distance range $d_1$ (e.g., as shown in FIG. 4), the controller 28 activates only light source 14a such that the indicator 16 luminesces in a green color (emitted by the UV ink). The first distance range $d_1$ may have a set maximum distance or extend out to the maximum detection range of the proximity sensors 22, 24, 26. If the object 38 is detected within a second distance range $d_2$ (FIG. 4), the controller 28 activates the first and second light sources 14a, 14b such that the indicator 16 luminesces in a yellow color defined by a color mixing of green (emitted by the UV ink) and red (emitted by the IR ink). If the object 38 is detected within a third distance range $d_3$ (FIG. 4), the controller 28 activates only light source 14b such that the indicator 16 luminesces in a red color (emitted by the IR ink). With respect to the present embodiment, the specific color yellow may be determined via pulse-width modulation of light sources 14a and 14b. By the same token, it will be appreciated that other colors may be achieved by mixing green and red light.

In the depicted embodiment of FIG. 4, distance range $d_1$ includes one or more distances and is set furthest away from the vehicle 12 whereas distance $d_3$ includes one or more distances and is set closest to the vehicle 12. Distance range $d_2$ includes one or more distances and is set between distance ranges $d_1$ and $d_3$. Thus, it is to be understood that the color in which the indicator 16 luminesces serves to indicate a proximity of a detected object (e.g., object 38) relative to the vehicle 12. For example, when the indicator 16 luminesces in green, the driver of the vehicle 12 is simply notified that an object has been detected in the operating environment of the vehicle 12. When the indicator 16 luminesces in yellow, the driver of the vehicle 12 is cautioned of the presence of the detected object. Lastly, when the indicator 16 luminesces in red, the driver of the vehicle 12 is warned of a potentially dangerous condition such as a possible collision with the detected object. Thus, by associating a particular color in which the indicator 16 luminesces to a relative proximity of a detected to the vehicle 12, the driver can quickly engage in a countermeasure, if necessary. As such, it should be appreciated that the indicator 16 may be arranged as any visual and is not necessarily limited to a text or other identifier. While the colors green, yellow, and red are employed in the present embodiment, it will be appreciated that other colors may be used in their place.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims, as set forth below, are incorporated into and constitute part of this Detailed Description.

What is claimed is:

1. A display system of a vehicle, comprising:
   light sources and respective silicone lenses coupled with a headliner;
   an indicator that luminesces in response to light excitation by the light sources; and
   a controller for selectively operating each of the light sources based on input from one or more proximity sensors, the indicator luminescing in one of a number of colors depending on which of the light sources is activated, and each color indicating the proximity of a detected object relative to the vehicle and a vehicle speed.

2. The display system of claim 1, wherein the indicator luminesces in a first color in response to excitation by only a first light source, a second color in response to excitation by only a second light source, and a third color in response to excitation by the first and second light sources, wherein the first, second, and third colors are visually distinguishable from each other.

3. The display system of claim 2, wherein the first, second, and third colors are green, red, and yellow, respectively.

4. The display system of claim 1, wherein the controller is configured to:
   activate only a first light source if an object is detected at a first distance from the vehicle;
   activate only the first source and a second light source if the object is detected at a second distance from the vehicle, the second distance less than the first distance; and
   activate only the third light source if the object is detected at a third distance from the vehicle, the third distance less than the second distance, wherein each of the first, second, and third distances are varied based on a vehicle speed.

5. The display system of claim 4, wherein the first distance is closest to the vehicle, the third distance is furthest from the vehicle, and the second distance is between the first and third distances.

6. The display system of claim 1, wherein the input is wirelessly transmitted to the controller by the one or more proximity sensors.

* * * * *